W. H. SHERBONDY.
CURRENT REGULATOR.
APPLICATION FILED JUNE 8, 1910.
1,026,775.
Patented May 21, 1912.
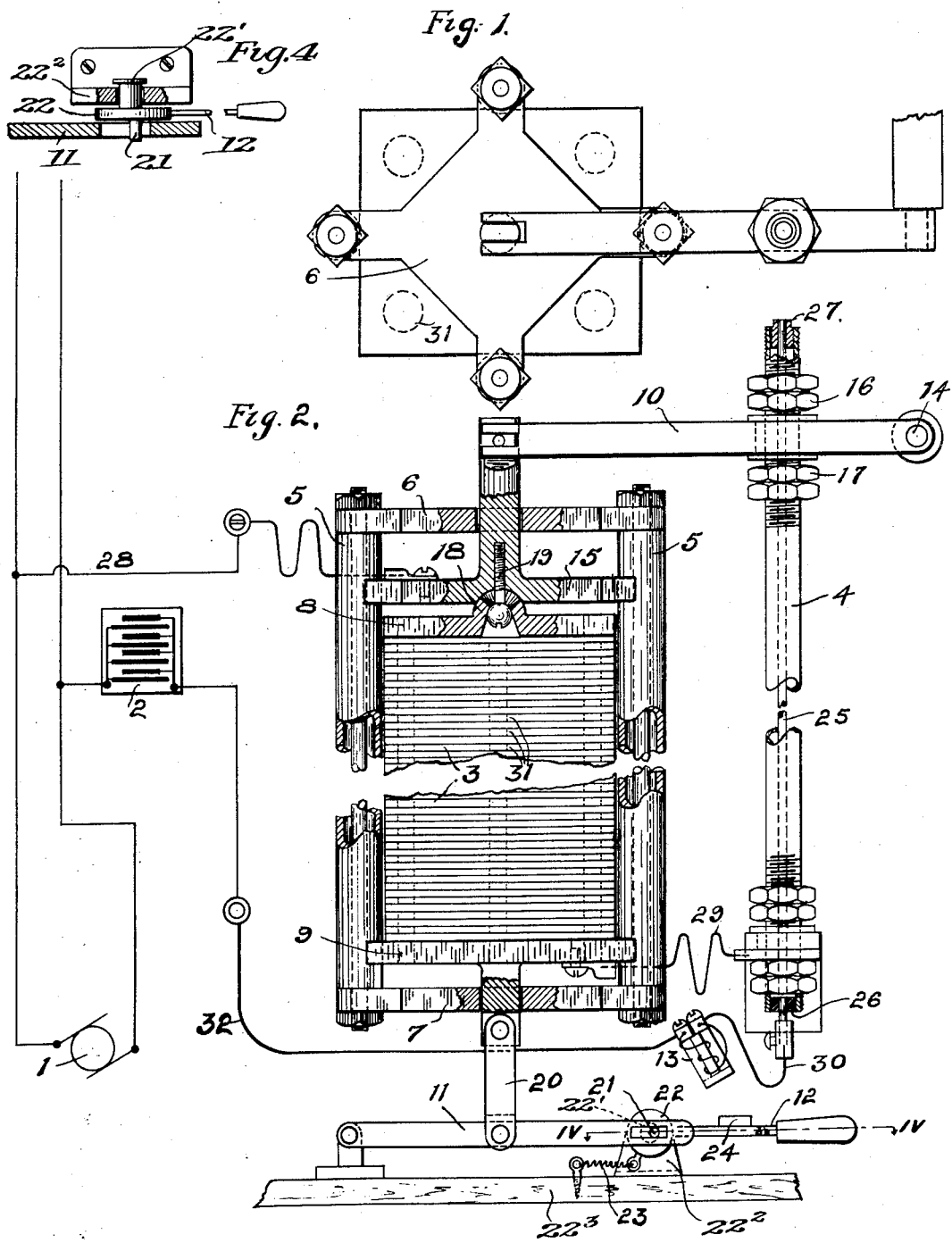

UNITED STATES PATENT OFFICE.

WILLIAM H. SHERBONDY, OF FORT WAYNE, INDIANA.

CURRENT-REGULATOR.

1,026,775. Specification of Letters Patent. Patented May 21, 1912.

Application filed June 8, 1910. Serial No. 565,853.

*To all whom it may concern:*

Be it known that I, WILLIAM H. SHERBONDY, a citizen of the United States, residing at Fort Wayne, in the county of Allen and State of Indiana, have invented certain new and useful Improvements in Current-Regulators, of which the following is a specification.

The invention relates to apparatus for regulating current, and in the specific embodiment to regulators used in connection with systems for charging storage batteries. It has for its primary objects; the provision of a regulator of simple and cheap construction which will operate with reliability and steadiness; the provision of a regulator which will operate successfully with a carbon pile and with a slow even action and without jar or vibration; the provision of a regulator in which the plates of the carbon pile separate immediately upon a decrease of pressure on the pile and separate proportionately to such decrease of pressure; and the provision of a regulator having improved thermostatic regulating means of rigid construction and positive action which will at the same time be exceedingly sensitive and operable by a small amount of current. Certain embodiments of the invention are illustrated in the accompanying drawings wherein, Figure 1 is a plan view of the preferred form of apparatus, Figure 2 is a side elevation of such apparatus, Figure 3 illustrates in plan and side elevation a modified form of carbon plates which may be employed in lieu of the carbon plates indicated in Figs. 1 and 2, and Figure 4 is a section on the line IV—IV of Fig. 2.

Referring first to the arrangement of Figs. 1 and 2, the principal parts of the apparatus shown may be enumerated as follows. 1 is the current generator; 2 is the storage battery to be charged from the generator; 3 is a carbon pile, by whose resistance the amount of current supplied to the battery is to be regulated; 4 is a thermostat tube by means of which the pressure between the plates constituting the carbon piles 3 is regulated; 5 are the porcelain posts constituting the guide frame inclosing the carbon plates, which posts are connected at their ends by means of the spiders 6 and 7; 8 and 9 are metal plates mounted between the posts 5 and bearing against the end plates of the pile 3; 10 is a lever for operating the sliding plate 8 from the thermostat tube 4; 11 is a lever for operating the plate 9; 12 is a lever provided with a handle and designed to operate the lever 11; and 13 is an electromagnet.

The lever 10 is pivoted at one end to a post 14, and at its other end has the pin and slot connection shown connecting it with the stem carried by the plate 15. The lever is secured to the thermostat tube by means of the nuts 16 and 17 threaded upon the tube, and locked in position by the lock nuts shown the tube 4 fitting somewhat loosely to the lever 10 so that the lever can rock slightly with respect to the tube. In order that the plate 8 may adjust itself to the position of the carbon plates upon which it rests, such plate is connected to the plate 15 by means of the ball joint 18, the ball headed screw 19 serving to hold the two plates together.

The lever 11 is connected to the spider 9 by means of the connecting rod 20, and the outer end of this lever 11 is provided with a slot to receive the pin 21 carried eccentrically upon the disk 22 lying immediately behind the lever. The disk 22 is pivoted at 22' in a bracket 22² carried by the base 22³ of the apparatus, and is provided with an operating handle 12. The disk 22 is normally held in the position illustrated by means of the spring 23, but may be rotated to move the lever 11 up and down by means of the lever 12, which carries an armature 24 for coöperating with the electromagnet 13.

Extending through the tube 4 is a heating wire 25 which wire is insulated from the tube at its lower end by means of the plug 26, and is connected to such tube at its upper end by means of the metal plug 27. The provision of the tube 4 in connection with the heating wire is desirable, as the wire 25 can be heated by a small amount of current and the tube 4 affords the necessary strength and rigidity for operating the resistance mechanism. The thermostat can thus be efficiently operated by a small amount of current.

The circuit through the apparatus from the generator 1 to the battery 2 is as follows. wire 28, plates 15 and 8, carbon pile 3, plate 9, wire 29, tube 4, plug 27, wire 25, wire 30 winding of electromagnet 13 and wire 32 to the battery 2.

Starting with the parts in the position shown in Fig. 2, the operation is as follows. With the parts in the position shown in Fig. 2, no current flows through the apparatus because of the looseness of the pile 3. If now the handle 12 be moved upward it will cause the rotation of the disk 22, and the pin 21 coöperating with the lever 11 will move the plate 9 upward pressing the plate and the pile both together so that the current can flow therethrough. Current will now flow from the generator through the circuit heretofore described to the battery 2. If the current becomes too strong the heating of the wire 25 will so heat the tube 4 that it will expand causing the lever 10 to move upward thus releasing the pressure upon the pile so that the resistance is increased and the current correspondingly cut down. If, on the other hand, the current falls below a certain point the cooling of the tube 4 causes the lever 10 to move downward thus increasing the pressure upon the pile and removing a certain proportion of the resistance offered by the pile. If the current through the circuit is cut off or reversed the electromagnet 13 releases the armature 24 permitting the parts to move to the position indicated in Figure 2 and so loosening the pile.

In order to prevent the plates constituting the pile 3 from sticking together when the pressure thereon is released every alternate plate is bored with a series of holes 31, which arrangement, I have found prevents the plates from sticking together as they otherwise would do if the smooth surfaces of the plates were not cut away in some manner or other. This object may be accomplished in other ways, as by providing grooves 32 in the surfaces of the plates as indicated in Figure 3, it being immaterial in so far as the broad invention is concerned whether the faces of the plates be cut away by the provision of holes extending clear through the plates or by cutting the surface of the plate itself as indicated in Figure 3 or in some other way. I have found that this feature of construction renders the operation of the device much more smooth and even, and does away with the necessity of compensating devices which would otherwise be necessary in order to prevent an uneven operation of the device due to the sticking of the carbon plates.

Having thus described my invention and illustrated its use, what I claim as new and desire to secure by Letters Patent is the following:—

1. In a current regulating device, a circuit, a carbon pile in the circuit, a hollow expansible operating member having such connection with the pile that the members thereof are normally pressed together when the operating member is cool and the pressure between the members of the pile is decreased as the member is heated and expands, and a heating wire connected to the circuit to be regulated and extending through the said hollow member.

2. In a current regulating device, a circuit, a carbon pile in the circuit, an expansible operating tube of a material having a relatively high coefficient of expansion which when cold holds the members of the pile together and arranged so that the pressure between the members of the pile is decreased as the tube is heated and expands, and a heating wire extending through the tube and adapted to heat such tube and connected to the circuit to be regulated.

3. In a current regulating device, a circuit, a carbon pile in the circuit, an expansible operating tube of a material having a relatively high coefficient of expansion, a lever connection between the tube and pile arranged to decrease the pressure between the members of the pile as the tube is heated and expands, and a heating wire extending through the tube and adapted to heat such tube and connected to the circuit to be regulated.

4. In a current regulating device, a circuit, a carbon pile in the circuit, an expansible operating tube adjacent the pile, a multiplying connection from the tube to the pile arranged to reduce the pressure between the members of the pile as the tube expands, and a heating wire connected to the circuit and extending through the tube and arranged so as to heat such tube.

In testimony whereof I have hereunto signed my name in the presence of the two subscribed witnesses.

W. H. SHERBONDY.

Witnesses:
J. C. BRADLEY,
I. M. BLAINE.